US012328661B2

(12) United States Patent
Lee

(10) Patent No.: US 12,328,661 B2
(45) Date of Patent: Jun. 10, 2025

(54) BROADCAST SIGNAL OUTPUT DEVICE AND VEHICLE HAVING THE SAME

(71) Applicants: HYUNDAI MOTOR COMPANY, Seoul (KR); KIA CORPORATION, Seoul (KR)

(72) Inventor: Sang Heun Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 400 days.

(21) Appl. No.: 17/869,435

(22) Filed: Jul. 20, 2022

(65) Prior Publication Data

US 2023/0138398 A1    May 4, 2023

(30) Foreign Application Priority Data

Nov. 4, 2021   (KR) .................. 10-2021-0150353

(51) Int. Cl.
*H04W 48/10*   (2009.01)
*H04B 17/327*   (2015.01)
*H04W 48/16*   (2009.01)

(52) U.S. Cl.
CPC .......... *H04W 48/10* (2013.01); *H04B 17/327* (2015.01); *H04W 48/16* (2013.01)

(58) Field of Classification Search
CPC ........ H04H 20/57; H04H 20/33; H04H 60/51; H03J 7/183
See application file for complete search history.

(56) References Cited

U.S. PATENT DOCUMENTS

| 2009/0158359 | A1* | 6/2009 | Shitanaka | ........ H04N 21/41422 |
| | | | | 725/75 |
| 2012/0192241 | A1* | 7/2012 | Cho | .................. H04W 72/0446 |
| | | | | 725/116 |
| 2022/0011442 | A1 | 1/2022 | Lee et al. | |

FOREIGN PATENT DOCUMENTS

| CN | 105721004 | * | 6/2016 | ............. H04B 1/082 |
| CN | 105721004 A | * | 6/2016 | ............. H04B 1/082 |
| KR | 20120037741 | * | 4/2012 | ........... H04B 1/1027 |
| KR | 20120037741 A | * | 4/2012 | ........... H04B 1/1027 |
| KR | 20220005904 A | | 1/2022 | |

* cited by examiner

*Primary Examiner* — Derrick W Ferris
*Assistant Examiner* — Won Jun Choi
(74) *Attorney, Agent, or Firm* — Lempia Summerfield Katz LLC

(57) ABSTRACT

Provided is a broadcast signal output device and a vehicle having the same. The broadcast signal output device includes: a communicator configured to receive current location information; a memory in which map information is stored; a tuner configured to receive a broadcast signal having a frequency; a processor configured to determine whether a current location is a shadow area based on the current location information and the map information, determine whether a broadcast device is present upon determining that the current location is the shadow area, mute the received broadcast signal to prevent noise from being output upon determining that the broadcast device is absent, and control an output of the received broadcast signal upon determining that the broadcast device is present; and a sound outputter configured to output an audio signal in the received broadcast signal in response to a control command of the processor.

19 Claims, 9 Drawing Sheets

FIG. 5

| LOCATION INFORMATION | | | RADIO BROADCAST INFORMATION | | | OTHER INFORMATION | |
|---|---|---|---|---|---|---|---|
| LATITUDE | LONGITUDE | LEGAL DONG CODE | FREQUENCY | RSSI | BROADCASTING STATION NAME | TIME INFORMATION | VEHICLE INFORMATION |
| 37.214 | 128.45 | 13420 | 107.7 | 50 | SBS | ... | ... |
| ... | ... | ... | 89.1 | 70 | (OMISSION) | ... | ... |
| ... | ... | ... | 97.3 | 40 | MBC | ... | ... |

Class 1: △ ← THERE IS BROADCAST DEVICE IN TUNNEL

Class 2: ☐ ← THERE IS NO BROADCAST DEVICE

○ ← New data

BROADCAST SIGNAL OUTPUT DEVICE AND VEHICLE HAVING THE SAME

CROSS-REFERENCE TO RELATED APPLICATION

This application claims priority under 35 U.S.C. § 119 to Korean Patent Application No. 10-2021-0150353, filed on Nov. 4, 2021 in the Korean Intellectual Property Office, the disclosure of which is incorporated herein by reference.

BACKGROUND

1. Field

The present disclosure relates to a broadcast signal output device for receiving a broadcast signal transmitted from a broadcasting station and smoothly outputting the received broadcast signal, and a vehicle having the same.

2. Description of the Related Art

The statements in this section merely provide background information related to the present disclosure and may not constitute prior art.

A vehicle is a machine that travels by driving wheels and transports people or cargo while moving on a road. In addition to such a basic driving function, vehicles perform additional functions for user convenience, such as audio functions, video functions, navigation functions, air conditioning functions, broadcasting functions, seat resistive wire functions, and communication functions with external terminals.

When a vehicle performs at least one of an audio function, a video function, and a broadcasting function, the vehicle receives a broadcast signal regarding various types of information, such as traffic information, news information, television (TV) broadcasting information, and radio information transmitted from a broadcasting station and outputs the received broadcast signal using an audio device or a video device.

When receiving and outputting the broadcast signal, the vehicle entering a shadow area may have difficulty smoothly receiving the broadcast signal.

For example, when the vehicle is located in a shadow area, such as a city area covered with a forest of buildings or a mountain or tunnel, radio wave attenuation occurs and communication with a satellite is interrupted. As such, it it is difficult to receive broadcast signals (AM, FM, DMB, etc.). Accordingly, the vehicle may not normally output a broadcast through a broadcast signal output device, such as an audio device or a video device.

SUMMARY

The disclosure provides a broadcast signal output device capable of, in response to a broadcast alternative mode when the current location is a shadow area of broadcast signal reception, muting a received broadcast signal to prevent noise from being output or outputting a broadcast signal of a receivable frequency, and a vehicle having the same.

The technical objectives of the disclosure are not limited to the above, and other objectives may become apparent to those of ordinary skill in the art based on the following descriptions.

According to an aspect of the disclosure, a broadcast signal output device includes: a communicator configured to receive current location information; a memory in which map information is stored; a tuner configured to receive a broadcast signal having a frequency; a processor configured to determine whether a current location is a shadow area based on the current location information and the map information, determine whether a broadcast device is present upon determining that the current location is the shadow area, mute the received broadcast signal to prevent noise from being output upon determining that the broadcast device is absent, and control output of the received broadcast signal upon determining that the broadcast device is present; and a sound outputter configured to output an audio signal in the received broadcast signal in response to a control command of the processor.

The memory may store location information of the shade area, and the processor may compare the current location information with the location information of the shadow area stored in the memory to determine whether the current location is the shadow area.

The communicator may perform communication with a server, and the processor may be configured to, upon determining that the current location is the shadow area, transmit the current location information to the server, receive information about an existence of a shadow area specific broadcast device from the server, and determine whether the broadcast device is present in the shadow area of the current location based on the received information about the existence of the shadow area specific broadcast device.

The processor may be configured to learn the information about the existence of the shadow area specific broadcast device received from the server to determine whether the broadcast device is present in the shadow area of the current location.

The processor may be configured to control the communicator to transmit receive signal strength indicator (RSSI) information at an entry point of the shadow area, RSSI information in the shadow area, and RSS information at an exit point of the shadow area to the server.

The processor may be configured to determine whether the broadcast device is present in the shadow area on the basis of the RSSI information at the entry point of the shadow area, the RSSI information in the shadow area, and the RSS information at the exit point of the shadow area.

The broadcast signal output device may further include a display, wherein the processor may be configured to, upon determining that the current location is the shadow area, control the display to display information about a broadcast signal having a frequency receivable through the tuner.

The broadcast signal output device may further include a broadcast signal processor configured to acquire information about an RSSI of the received broadcast signal, wherein the processor may be configured to, upon determining that the current location is the shadow area and the broadcast device is present in the shadow area, determine whether the acquired RSSI is greater than or equal to a reference RSSI, and upon determining that the acquired RSSI is greater than or equal to the reference RSSI, remove noise from the audio signal in the received broadcast signal to adjust a sound quality.

The processor may be configured to, upon determining that the acquired RSSI is less than the reference RSSI, perform a first broadcast output mode to output a same broadcast program as a broadcast program before the entry into the shadow area.

The processor may be configured to, upon determining that the acquired RSSI is less than the reference RSSI, perform a second broadcast output mode to output a broadcast signal having a frequency different from a broadcast signal having a frequency received before the entry into the shadow area.

The broadcast signal output device may further include a broadcast signal processor configured to acquire information about an RSSI of the received broadcast signal, wherein the processor may be configured to, upon determining that the current location is the shadow area and the broadcast device is present in the shadow area, determine whether the acquired RSSI is greater than or equal to a reference RSSI, and upon determining that the acquired RSSI is greater than or equal to the reference RSSI, perform a first broadcast output mode to output a same broadcast program as a broadcast program before the entry into the shadow area.

The processor may be configured to, upon determining that the acquired RSSI is less than the reference RSSI, perform a second broadcast output mode to output a broadcast signal having a frequency different from a broadcast signal having a frequency received before the entry into the shadow area.

The processor may be configured to, upon determining that the current location is the shadow area and the broadcast device is present in the shadow area, perform a first broadcast output mode to output a same broadcast program as a broadcast program before the entry into the shadow area.

The broadcast signal output device may further include a broadcast signal processor configured to acquire information about an RSSI of the received broadcast signal, wherein the processor may be configured to, upon checking that the RSSI is greater than or equal to a preset RSSI, determine that the broadcast device is present, and upon checking that the RSSI is less than the preset RSSI, determine that the broadcast device is absent.

The broadcast signal output device may further include an inputter, wherein the processor may be configured to, upon receiving a first broadcast output mode through the inputter, determine whether the current location is a shadow area in which a broadcast device is provided, and upon determining that the current location is the shadow area in which the broadcast device is provided, check a broadcast program being broadcast, check a frequency for outputting the checked broadcast program, and control the tuner to receive a broadcast signal having the checked frequency.

The broadcast signal output device may further include an inputter, wherein the processor may be configured to, upon receiving a second broadcast output mode through the inputter, determine whether the current location is a shadow area in which a broadcast device is provided, and upon determining that the current location is the shadow area in which the broadcast device is provided, check a broadcast signal having a receivable frequency, and control output of the checked broadcast signal.

The broadcast signal output device may further include a display, wherein the processor may be configured to control the display to output a video signal in the broadcast signal.

According to another aspect of the disclosure, there is provided a vehicle including: an inputter; a location receiver configured to receive current location information; and a broadcast signal output device configured to receive a broadcast signal having a frequency and output an audio signal in the received broadcast signal, wherein the broadcast signal output device is configured to: determine whether a current location is a shadow area based on the current location information and pre-stored map information, and upon determining that the current location is the shadow area, check information about a receive signal strength indicator (RSSI) of the received broadcast signal and determine whether a broadcast device is present based on the checked RSSI, and in response to whether the broadcast device is present and a broadcast alternative mode input by the inputter, mute the received broadcast signal to prevent noise from being output or control output of the received broadcast signal.

The broadcast signal output device may be configured to, upon checking that the RSSI is greater than or equal to a preset RSSI, determine that the broadcast device is present, and upon checking that the RSSI is less than the preset RSSI, determine that the broadcast device is absent.

The broadcast signal output device may be configured to, upon determining that the broadcast alternative mode is a first broadcast output mode, check a broadcast program being broadcast, check a frequency for outputting the checked broadcast program, and control a tuner to receive a broadcast signal having the checked frequency, and upon determining that the broadcast alternative mode is a second broadcast output mode, check a broadcast signal having a frequency receivable through the tuner, and control output of the checked broadcast signal.

The vehicle may further include a display, wherein the broadcast signal output device may be configured to control the display to output a video signal in the broadcast signal.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a diagram illustrating broadcast information for each shadow area received by a broadcast signal output device of a vehicle according to an embodiment;

Figure 1:
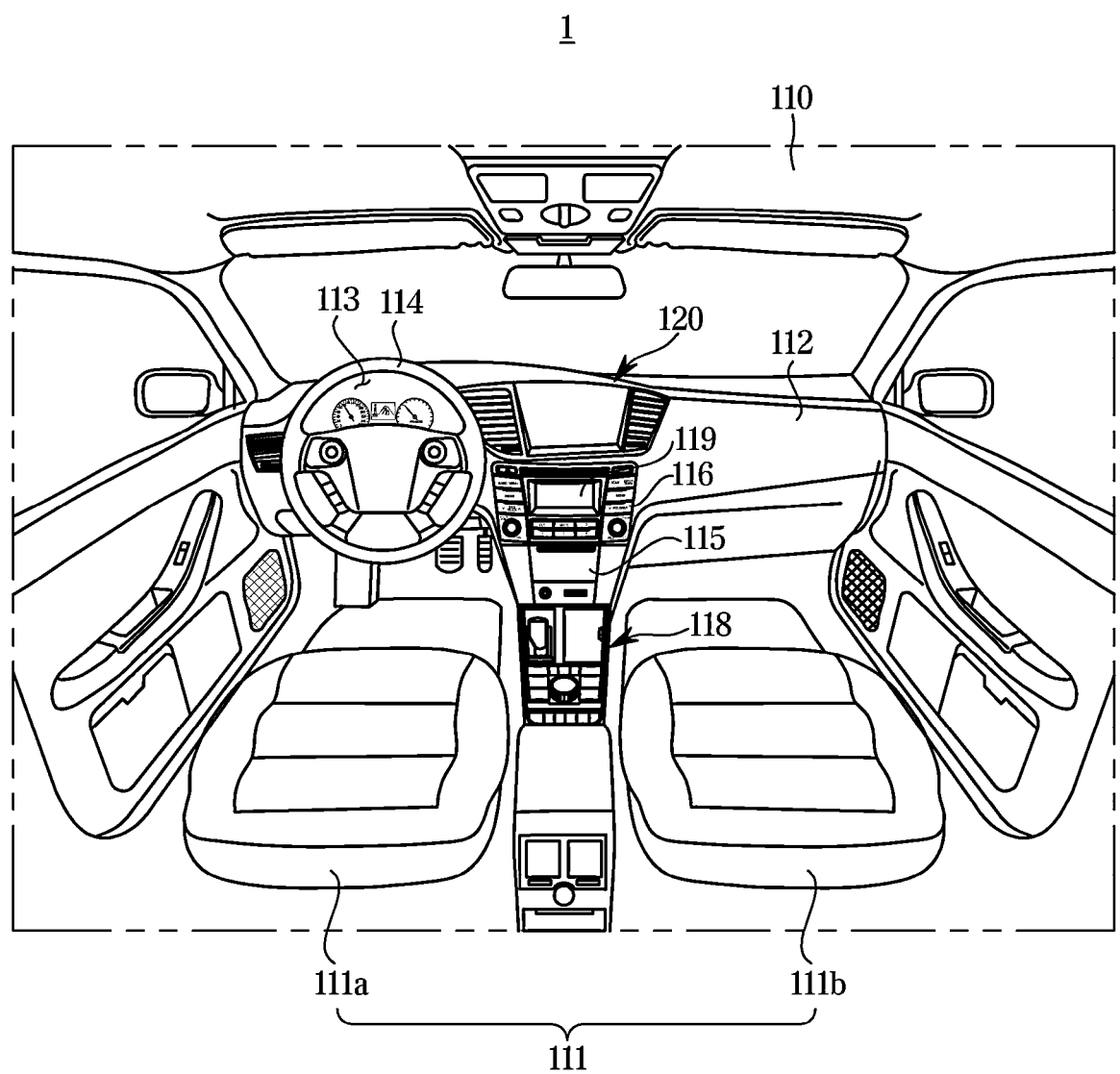
FIG. 1 is a view illustrating the interior illustrating a vehicle according to an embodiment.

The drawings described herein are for illustration purposes only and are not intended to limit the scope of the present disclosure in any way.

DETAILED DESCRIPTION

Like numerals refer to like elements throughout the specification. Not all elements of embodiments of the present disclosure are described, and description of what are commonly known in the art or what overlap each other in the embodiments is omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise. When a component, device, element, or the like of the present disclosure is described as having a purpose or performing an operation, function, or the like, the component, device, or element should be considered herein as being "configured to" meet that purpose or to perform that operation or function.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 is a view illustrating the interior illustrating a vehicle according to an embodiment.

A vehicle 1 includes a body having an interior and an exterior, and a chassis which is a part of the vehicle 1 except for the body, in which mechanical devices required for traveling are installed.

The exterior of the body includes a front panel, a bonnet, a roof panel, a rear panel, a trunk, front and rear, left and right doors, and window glasses provided on the front and rear, left and right doors to be openable and closable, and further includes a side mirror for providing a driver with a field of view corresponding to a rear side of the vehicle.

Referring to FIG. 1, the interior of the body includes a seat 111 on which an occupant sits, a dashboard 112, an instrument board 113 (i.e., a cluster 113) disposed on the dashboard 112 and mounting a tachometer, a speedometer, a coolant thermometer, a fuel gauge, a turn indicator, a high-beam light, a warning light, a seat belt warning light, an odometer, an odograph, an automatic shift selector light, a door open warning light, an engine oil notification light, and a low fuel warning light thereon, a steering wheel 114 for manipulating the heading direction of the vehicle, and a center fascia 115 on which a vent and a control panel of an air conditioner are disposed and an audio device is disposed.

The seat 111 includes a driver seat 111a on which the driver sits, a passenger seat 111b on which a passenger sits, and a rear seat positioned on a rear side in the vehicle.

The cluster 113 may be implemented in a digital manner. That is, the digital cluster 113 displays vehicle information and travelling information as images.

The center fascia 115 is a portion of the dashboard 112 positioned between the driver seat 111a and the passenger seat 111b, and includes a head unit 116 for controlling an audio device, an air conditioner, and a heater.

The vehicle 1 may further include an inputter 118 for receiving an operation command of a mode for various functions performed in the vehicle, and may further include a display 119 for displaying operation information.

The inputter 118 may be provided on at least one of the head unit 116, the center fascia 115, and the steering wheel 114.

The inputter 118 may transmit input information according to a user input to a controller in the head unit 116 or to a vehicle terminal 120.

The inputter 118 may receive an operation on/off command of the vehicle terminal 120, receive selection of at least one mode among a plurality of modes, and transmit information about the selected mode to the vehicle terminal 120.

For example, the inputter 118 may be configured to, when a navigation mode is selected, receive an input of destination information and transmits the input destination information to the vehicle terminal 120, and when a Digital Audio Broadcasting (DMB) mode (i.e., a broadcast mode) is selected, receive an input of broadcast channel and volume information, and transmit the input broadcast channel and volume information to the vehicle terminal 120, and when a radio broadcast mode is selected among broadcast modes, receive an input of radio channel and radio volume information and transmit the input radio channel and volume information to the vehicle terminal 120.

The inputter 118 may include a hardware device, such as various buttons or switches, a pedal, a keyboard, a mouse, a track-ball, various levers, a handle, or a stick.

In addition, the inputter 118 may include a graphical user interface (GUI), such as a touch pad, that is, a software device. The touch pad may be implemented as a touch screen panel (TSP) to form a mutual layer structure together with a display 119.

When the inputter is provided as a TSP forming a layer structure with a touch pad, the display 119 may also be used as the inputter 118.

The inputter 118 may include a touch panel integrally formed with a display of the vehicle terminal 120. The inputter 118 may be activated and displayed in the form of a button on the display of the vehicle terminal 120, and in this case, the inputter 118 receives location information of the displayed button.

The inputter 118 may receive a movement command and a selection command by a cursor displayed on the display of the vehicle terminal 120.

The inputter 118 may be configured to, during execution of a broadcast mode, a broadcast alternative mode in a shadow area. For example, the broadcast alternative mode may include a mute mode, a first broadcast output mode to output the same broadcast program having a different frequency, and a second broadcast output mode to output another broadcast program that is allowable for broadcasting.

Here, broadcasting is classified into long-wave broadcasting, medium-wave broadcasting (AM broadcasting), short-wave broadcasting, and very short-wave broadcasting (FM broadcasting) according to the frequency band used. The broadcasting may include: ground radio wave broadcasting that outputs a broadcast by receiving radio waves transmitted near the ground or from the surface of the earth; cable broadcasting that receives and outputs a broadcast signal through a cable; satellite broadcasting that receives and outputs a broadcast signal through a satellite; the Internet broadcasting that receives and outputs a broadcast signal using the Internet; internet protocol (IP) broadcasting that receives and outputs a broadcast signal based on a set-top box and an IP; and DMB broadcasting that receives and outputs a broadcast signal through a terminal capable of mobile communication.

Terrestrial broadcasting, cable broadcasting, satellite broadcasting, Internet broadcasting, IP broadcasting, and DMB may receive and output both a video signal and an audio signal in a broadcast signal.

The display 119 displays operation information of the head unit 116 and displays input information input to the inputter 118.

For example, the display 119 displays broadcast channel and volume information input by the user when a broadcast mode is selected.

The display 119 may display a broadcast alternative mode in a shadow area selected by the user.

The vehicle 1 may further include an audio device for performing an audio mode and an output device for performing a video mode. Here, the output device may include a broadcast signal output device for outputting a broadcast signal.

The audio device and the video device may be integrally provided with each other or separately provided in different spaces.

The vehicle terminal 120 may be mounted on a dashboard.

The vehicle terminal 120 may perform an audio mode, a video mode, a navigation mode, a broadcast mode, and a map display mode, and may display an image of the mode being performed.

Figure 2:
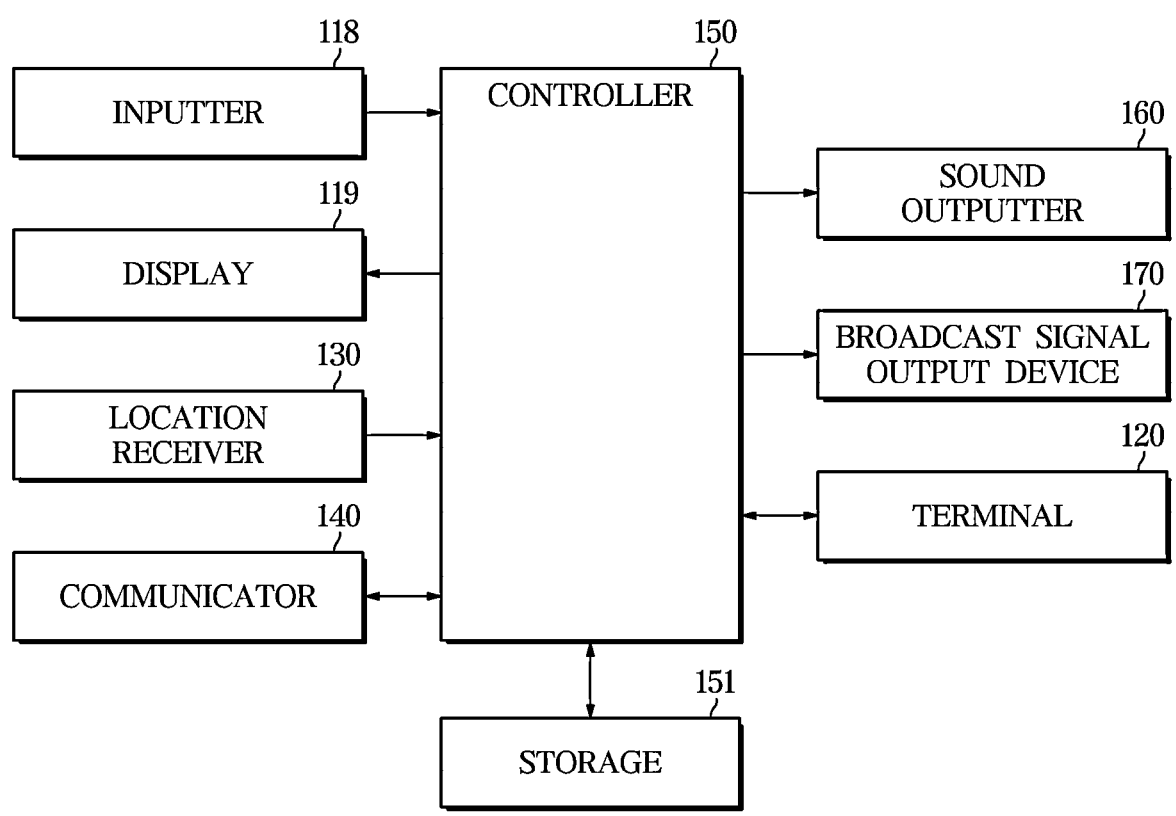
FIG. 2 is a control block diagram illustrating a vehicle according to an embodiment.
Figure 3:
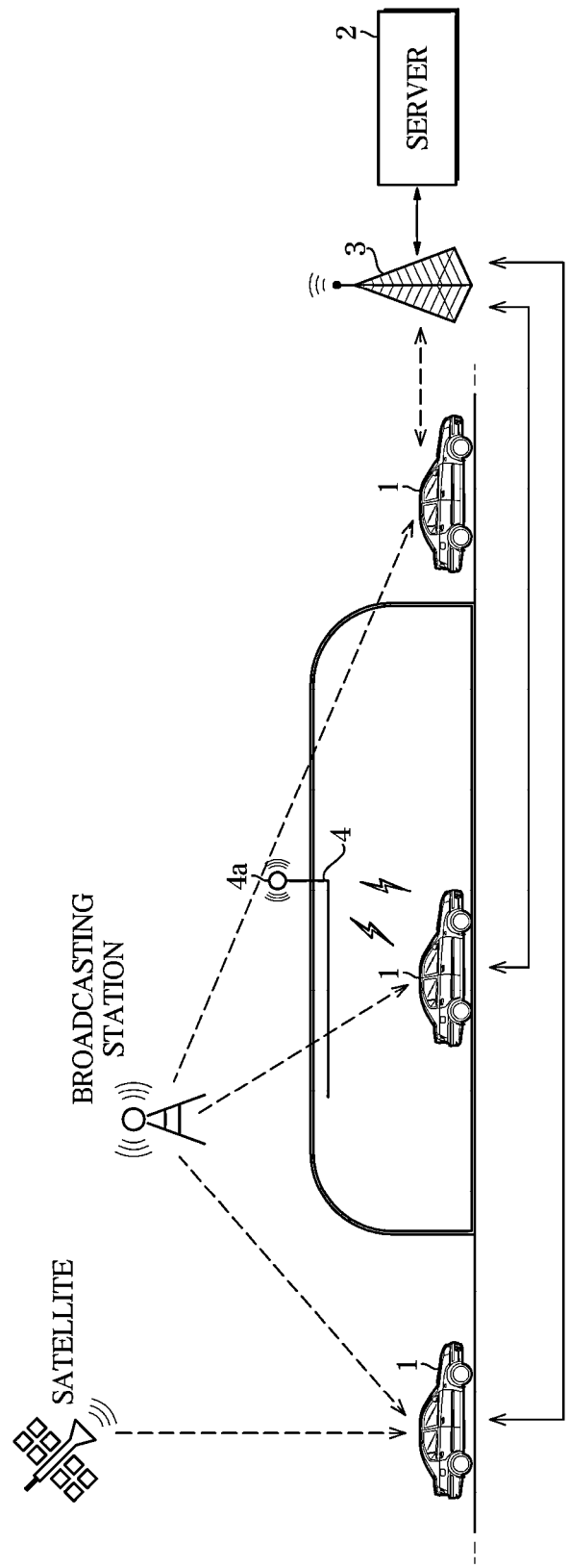
FIG. 3 is a diagram illustrating communication of a vehicle according to an embodiment.
Figure 4:
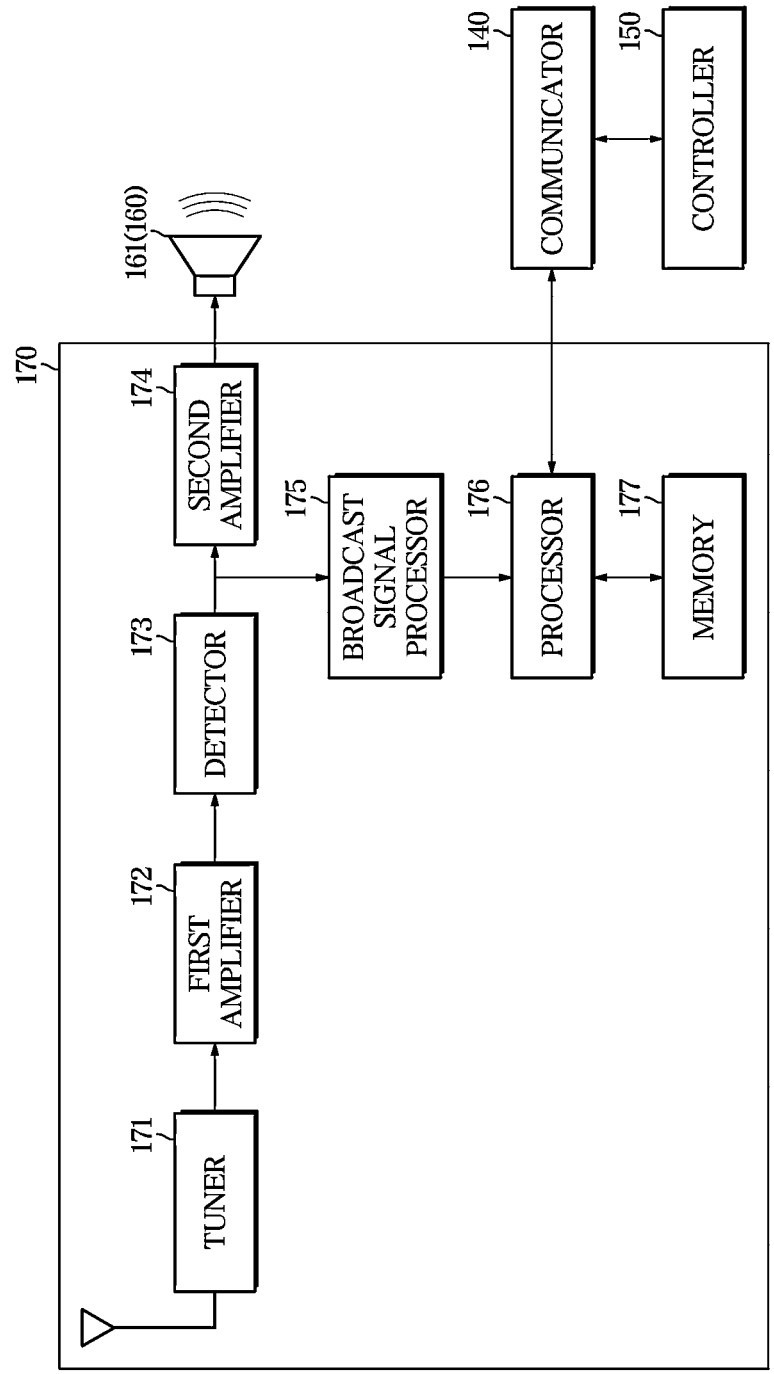
FIG. 4 is a detailed block diagram illustrating a broadcast signal output device provided in a vehicle according to an embodiment.

FIG. 2 is a control block diagram illustrating a vehicle according to an embodiment, FIG. 3 is a diagram illustrating communication of a vehicle according to an embodiment, and FIG. 4 is a detailed block diagram illustrating a broadcast signal output device provided in a vehicle according to an embodiment.

Referring to FIG. 2, the vehicle includes an inputter 118, a display 119, a terminal 120, a location receiver 130, a communicator 140, a controller 150, a storage 151, a sound outputter 160, and a broadcast signal output device 170.

The inputter 118 receives a user input and transmits input information about the received user input to the controller 150.

The inputter 118 may directly transmit the input information regarding the user input to a processor 176.

The inputter 118 receives an on/off command of a broadcast mode, and receives a broadcast channel, a broadcast volume, and a broadcast alternative mode in a shadow area during execution of a broadcast mode.

As an example, the inputter 118 may receive an on/off command of a radio broadcasting mode, receive a radio channel and a radio volume, and receive an automatic channel change command.

As another example, the inputter 118 may receive an on/off command of a satellite broadcast mode, receive a channel and volume of a satellite broadcast, and receive a broadcast program name.

The broadcast alternative mode in the shadow area may include a mute mode, a first broadcast output mode to output the same broadcast program having a different frequency, and a second broadcast output mode to output another broadcast program that is allowable for broadcasting.

The inputter 118 may receive music play, stop, and end commands during execution of an audio mode corresponding to reproduction of audio stored in a storage medium (not shown).

The inputter 118 may receive destination information and route selection information during execution of a navigation mode.

The display 119 displays information about the mode being performed in the vehicle.

For example, the display 119 may display a mode being performed, such as a broadcast mode, a call mode, a DMB mode, and a navigation mode. Here, the broadcast mode may include a radio broadcast mode, a terrestrial broadcast mode, a cable broadcast mode, a satellite broadcast mode, an Internet broadcast mode, an IP broadcast mode, and a DMB mode.

The display 119 may be configured to, in a broadcasting mode, display a broadcast channel selected by a user, display a volume, and display a broadcast alternative mode.

For example, the display 119 may be configured to, in a radio broadcasting mode, display a radio channel selected by the user, display a radio volume, and display whether automatic channel change is selected.

The display 119 may include a cathode ray tube (CRT) panel, a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED), but is not limited thereto.

The terminal 120 may perform a navigation mode based on map information, destination information, and location information of the location receiver 130. The terminal 120 may output navigation information corresponding to the navigation mode.

The terminal 120 may also perform a DMB mode in which a broadcast signal transmitted from a broadcasting station is received and a broadcast image and broadcast sound are output.

The terminal 120 may be configured to, in the execution of a broadcast mode, receive a broadcast signal for a broadcast channel selected by a user, display a video signal of the received broadcast signal as an image. The terminal 120 may also output an audio signal of the broadcast signal as sound.

The terminal 120 may be configured to, in the execution of a broadcast mode, display channel information allowable for broadcasting, display broadcast program information allowable for broadcasting, and display a broadcast alternative mode in a shadow area selected by a user.

The terminal 120 may display shadow area travelling information regarding a travel in a shadow area, display transit time information for passing through a shadow area, display whether a broadcast signal is received while the vehicle is travelling in a shadow area, and display information about whether a broadcast device exists in a shadow area.

The terminal 120 may display channel information and frequency information allowable for output in a shadow area, and may also display broadcast program information allowable for output.

The terminal 120 may include a display panel. In addition, the terminal 120 may include a touch screen in which a touch panel is integrated with a display panel.

The location receiver 130 receives location information about the current location of the vehicle.

The location receiver 130 may include a global positioning system (GPS) receiver including an antenna for receiving signals from a plurality of GPS satellites, and a signal processor for processing the GPS signals acquired from the GPS receiver. In addition, the signal processor may include software for acquiring current location information of the vehicle using distance and time information corresponding to location signals of the plurality of GPS satellites, and an outputter for outputting the acquired current location information of the vehicle.

The location receiver 130 may directly transmit the current location information of the vehicle to the processor 176.

The communicator 140 may include one or more components that enable communication with an external device, and may include, for example, at least one of a short-range communication module, a wired communication module, and a wireless communication module. Here, the external device may be a GPS satellite, a global navigation satellite system (GNSS) satellite, a broadcast satellite, a server 2, an infrastructure 3, and an antenna 4a of a broadcast device 4.

The broadcast device 4 is a device that receives a broadcast signal received through a broadcasting station, a broadcast satellite, a cable, the Internet, etc., and transmits the received broadcast signal, and may represent a rebroadcast device that receives external broadcast and retransmits the received external broadcast.

The short-range communication module may include various short-range communication modules that may transmit and receive signals in a short distance using a wireless communication network, for example, a Bluetooth module, an infrared communication module, a radio frequency identification (RFID) communication module, a wireless local access network (WLAN) communication module, a near field communication (NFC) communication module, a Zigbee communication module, and the like.

The wired communication module may include not only various wired communication modules, such as a controller area network (CAN) communication module, a local area network (LAN) communication module, a wide area network (WAN) module, or a value added network (VAN) module, but also various cable communication modules, such as a universal serial bus (USB), a high definition multimedia interface (HDMI), a digital visual interface (DVI), a recommended standard 232 (RS-232), power line communication, or plain old telephone service (POTS).

The wireless communication module may include various wireless communication modules for supporting various wireless communication methods, such as a Wifi module, a wireless broadband (Wibro) module, a global system for mobile communication (GSM), a code division multiple access (CDMA), a wideband code division multiple access (WCDMA), universal mobile telecommunications system (UMTS), a time division multiple access (TDMA), a long term evolution (LTE), and the like.

The communicator 140 may communicate with a broadcasting station of outside. The communicator 140 may further include a broadcasting communication module, such as Transport Protocol Expert Group (TPEG), Sign-extension mode (SXM), or radio data system (RDS) of DMB.

Referring to FIG. 3, the vehicle 1 may perform communication with a satellite for transmitting satellite information, an antenna of a broadcasting station for transmitting a broadcast signal, a server 2, an infrastructure 3, and an antenna 4a of a broadcast device in a shadow area.

The controller 150 transmits information input to the inputter 118 to at least one of the broadcast signal output device 170 or the terminal 120.

The controller 150 may control the operations of the broadcast signal output device 170 and the terminal 120 based on the information input to the inputter 118.

The controller 150 may recognize the current location information of the vehicle based on the satellite information received by the location receiver 130, and perform a navigation mode based on the recognized current location information, destination information, and map information of the vehicle. And the controller 150 may control output of navigation information corresponding to the navigation mode.

The controller 150 may determine whether the current location is a shadow area based on the recognized current location information of the vehicle and location information of a shadow area stored in the storage 151.

The controller 150 may be configured to, upon determining that the current location is an entry point of the shadow area, transmit information about entering the shadow area to the broadcast signal output device 170. Upon determining that the current location is an exit point of the shadow area, the controller 150 may transmit information about exiting the shadow area to the broadcast signal output device 170.

The controller 150 may acquire time information for leaving the shadow area based on length information of the shadow area and travelling speed information, and determine whether the vehicle has exited the shadow area based on the time information.

The controller 150 may also acquire information about the travelling speed of the vehicle based on a change in the current location information according to time.

The vehicle may further include a speed detector (not shown) for acquiring travelling speed information of the vehicle. For example, the speed detector may include at least one of a plurality of wheel speed sensors and an acceleration sensor.

The controller 150 may determine whether the current location is the entry point of the shadow area based on the current location information and the map information, and may control the display 119 to display information about entering the shadow area, and control the display 119 to display length information of the shadow area. The length information of the shadow area may be a length between the entry point and the exit point.

For example, the controller 150 may determine whether the current location is a location before entering a tunnel. Upon determining that the current location is a location before entering the tunnel, the controller 150 may transmit tunnel entry information indicating an entry into the tunnel to the broadcast signal output device 170, and also to the server 2.

The controller 150 may transmit broadcast information to the server 2 during execution of a broadcast mode. Here, the broadcast information may be broadcast channel information, broadcast program information, or frequency information.

The controller 150 may transmit, to the server 2, information about the position before entering the shadow area, the internal position of the shadow area, and the position after existing from the shadow area during travelling in the shadow area, and information about a receive signal strength indicator (RSSI) at each position. In this case, the controller 150 may also transmit identification information of the vehicle or identification information of the user together with the above-described information to the server 2.

The controller 150 may transmit the current location information to the broadcast signal output device 170 and the terminal 120.

When information input to the inputter 118 is input information corresponding to a broadcasting mode, the controller 150 may transmit the information input to the inputter 118 to the broadcast signal output device 170. For example, the input information input to the inputter 118 may include a broadcast alternative mode, channel information, and volume information.

The controller 150 may control the display 119 to output information about the mode being performed in the vehicle as an image.

The controller 150 may be an electronic control unit (ECU) provided in the vehicle, or may be the processor 176 of the broadcast signal output device 170.

In other words, the controller 150 may be implemented as one part with the processor 176 of the broadcast signal output device 170, or may be implemented separately as in the present embodiment.

The controller 150 may include a memory (not shown) for storing data regarding an algorithm for controlling the operations of the components of the vehicle 1 or a program that represents the algorithm, and a processor (not shown) that performs the above described operations using the data stored in the memory. In this case, the memory and the processor may be implemented as separate chips. Alternatively, the memory and the processor may be implemented as a single chip.

The storage 151 may store map information and may store location information for each shadow area. The storage may store location information and length information of tunnels among shadow areas.

The storage 151 may store identification information of a vehicle and may store identification information of a user.

The storage 151 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like., but the implementation of the storage 151 is not limited thereto. The storage unit 151 may be a memory implemented as a chip separate from the processor described above in connection with the controller 150, or may be implemented as a single chip with the processor. It may be implemented, but the disclosure is not limited thereto.

The sound outputter 160 outputs a sound regarding a mode being performed in the vehicle in response to a control command from the controller 150.

The sound outputter 160 may output an audio signal of navigation information as a sound, output an audio signal of content or an external broadcast as a sound, or output an audio signal of music or radio selected by a user as a sound.

For example, the sound outputter 160 outputs an audio signal of a radio broadcast signal as a sound at a volume selected by the user during execution of a radio broadcast mode.

The sound outputter 160 may include one or more speakers.

The speaker converts a signal transmitted from a second amplifier 174 into vibration of a diaphragm to generate a longitudinal wave in the air to radiate sound waves.

The broadcast signal output device 170 receives a broadcast signal of an outside and outputs the received broadcast signal. The broadcast signal output device 170 may output only an audio signal of the broadcast signal or both an audio signal and a video signal of the broadcast signal according to the selected broadcast mode.

The broadcast signal output device 170 may include at least one of a radio device (not shown), an audio device (not shown), or the terminal 120 provided in the head unit.

The radio device (not shown) may perform a radio broadcasting mode for receiving and outputting a broadcast signal transmitted from a radio broadcasting station, and the audio device (not shown) may perform an audio mode for playing a sound source stored in a universal serial bus (USB), a compact disk (CD), or a storage medium.

The terminal 120 may perform an audio/video (AV) broadcasting mode for receiving a broadcast signal transmitted from a broadcasting station and outputs an audio signal and a video signal in the received broadcast signal.

Referring to FIG. 4, the broadcast signal output device 170 may include a tuner 171, a first amplifier 172, a detector 173, the second amplifier 174, a broadcast signal processor 175, the processor 176, and a memory 177. Here, the second amplifier 174 may be provided in the sound outputter 160.

The tuner 171 may be connected to a broadcast antenna, and may receive a broadcast signal through the broadcasting antenna. Here, the broadcasting antenna receives broadcast signals transmitted from different broadcasting stations owned by a plurality of broadcast companies.

The tuner 171 may receive a broadcast signal corresponding to channel information during execution of a broadcast mode. In this case, the tuner 171 receives a broadcast signal having a frequency corresponding to a control command of the processor 176. Here, the frequency of the broadcast signal may match the channel information.

The first amplifier 172 amplifies the frequency signal received by the tuner 171.

The detector 173 demodulates the frequency signal amplified by the first amplifier 172 to output a signal in an audible frequency range.

The second amplifier 174 is connected between the detector 173 and a speaker 161, and amplifies the signal in the audible frequency range output from the detector 173 and transmits the amplified signal to the speaker 161, which is the sound outputter 160.

The broadcast signal processor 175 processes the signal demodulated by the detector 173 and transmits signal processing information to the processor 176.

The broadcast signal processor 175 may sample the demodulated signal, which is an analog signal, output from the detector 173 as a digital signal, and acquire a signal strength of the sampled digital signal. Here, the acquired signal strength may be a receive signal strength indicator (RSSI).

The processor 176 may be configured to, based on input information being received from the controller 150, control execution of a broadcast mode based on the received input information, and transmit performance information to the controller 150 while the broadcast mode is being performed.

The received input information may include an on-command of the broadcast mode, channel information, volume information, a broadcast alternative mode, and an off command of the broadcast mode, and the received input information may also include current location information.

The received input information may include entry information of the shadow area, travelling information within the shadow area, and exit information of the shadow area, and may further include length information of the shadow area.

The processor 176 may activate the tuner 171, the first amplifier 172, the detector 173, and the broadcast signal processor 175 in response to the on-command of the broadcast mode.

The processor 176 may control the tuner 171 to receive a broadcast signal corresponding to channel information selected by the user, and may control output of the broadcast signal received by the tuner 171.

In the case of a radio broadcast mode, the processor 176 may control output of an audio signal in a broadcast signal.

In the case of a terrestrial broadcasting mode, a cable broadcasting mode, a satellite broadcasting mode, an Internet broadcasting mode, an IP broadcasting mode, or a DMB mode, the processor 176 may control output of an audio signal and a video signal in a broadcast signal.

The processor 176 determines whether the current location is an entry point of the shadow area based on current location information and preset location information of a shadow area. Upon determining that the current location is the entry point of the shadow area, the processor 176 checks a broadcast alternative mode selected by the user.

The processor 176 may control execution of a broadcast alternative mode selected by the user while travelling in a shadow area.

When the broadcast alternative mode selected by the user is a mute mode, the processor 176 may be configured to perform a mute signal processing on the broadcast signal received by the tuner 171 to prevent the broadcast signal from being output. In other words, the processor 176 may prevent noise of the broadcast signal from being output during travelling in the shadow area in response to the mute signal processing.

When the broadcast alternative mode selected by the user is a first broadcast output mode, the processor 176 may be configured to check a frequency of a broadcast signal for broadcasting the same broadcast program as that output before entering the shadow area, among frequencies received by the broadcast antenna, from information stored in the memory, and further control the tuner 171 to receive the broadcast signal having the checked frequency, and control output of the signal received through the tuner 171.

For example, the processor 176 may control output of a first broadcast program of a first broadcast signal having a first frequency before entering the shadow area, and control output of the first broadcast program of a second broadcast signal having a second frequency while traveling in the shadow area.

The processor 176, in the performing of the first broadcast output mode, may check the RSSI of the first broadcast signal while broadcasting the first broadcast program, and determine whether to change the frequency based on the checked RSSI.

More specifically, the processor 176 samples the first broadcast signal of the first frequency as a digital signal, calculates the RSSI of the sampled signal, and calculates the signal-to-noise ratio of the sampled signal.

The processor 176 determines whether the calculated RSSI is less than or equal to a preset RSSI, and upon determining that the calculated RSSI is less than or equal to the preset RSSI, determines whether the calculated signal-to-noise ratio is less than or equal to a reference ratio. Upon determining that the calculated signal-to-noise ratio is less than the reference ratio, the processor 176 checks a broadcast company transmitting the first broadcast signal.

Next, the processor 176 checks the current location information of the vehicle, checks an area in which the vehicle is located based on the checked location information, checks a region corresponding to the checked area, checks the second frequency for transmitting the first broadcast program from the checked broadcast company.

The processor 176 may control the tuner 171 to receive the second broadcast signal having the second frequency. The processor 176 outputs the first broadcast program corresponding to the second broadcast signal having the second frequency.

The processor 176 may be configured to, when the broadcast alternative mode selected by the user is a second broadcast output mode, check frequencies having the reference RSSI, control display of pieces of channel information for broadcast signals having the checked frequencies, and control reception and output of a broadcast signal having channel information selected by the user among the displayed pieces of channel information.

The reference RSSI may be a preset RSSI.

Here, the frequency having the reference RSSI may be a frequency different from the frequency of the broadcast signal output before entering the shadow area.

The broadcast signal of the frequency having the reference RSSI may be different from the broadcast signal output before entering the shadow area.

The broadcast program output by the broadcast signal of the frequency having the reference RSSI may be the same as or different from the broadcast program output by the broadcast signal of the frequency received before entering the shadow area.

For example, the processor 176 may output a first broadcast signal having a first frequency before entering a shadow area to output a first broadcast program, and may output a second broadcast signal having a third frequency while travelling in the shadow area to output a second broadcast program.

The processor 176 may output a first broadcast signal having a first frequency before entering a shadow area to output a first broadcast program, and may output a fourth broadcast signal having a fourth frequency while travelling in the shadow area to output the first broadcast program.

The processor 176 may check communication status information of the shadow area at the entry point of the shadow area, and recommend a mute mode or channels for broadcasting based on the checked communication status information of the shadow area. That is, the processor 176 may control display of the broadcast alternative mode and recommendation information for channels.

The processor 176 may be configured to, in response to a broadcast signal for the same broadcast program with a different frequency being output during travel in the shadow area, store information about the broadcast program and frequency information before and after entering the shadow area, and transmit the information to the server 2.

The processor 176 may store information about frequencies having a RSSI greater than or equal to a reference RSSI during travel in a shadow area, and transmit the stored information about the frequencies to the server 2.

The processor 176 may transmit, to the server 2, information about the position before entering the shadow area, the internal position of the shadow area, and the position after existing from the shadow area during travel in the shadow area, and the RSSI at each of the positions. In this case, the processor 176 may transmit identification information of the vehicle or identification information of the user together with the position information and the RSSI to the server 2.

The processor 176 may perform big data-based machine learning to determine whether a broadcast device exists in the shadow area.

The processor 176 may check the RSSI of the broadcast signal while receiving the broadcast signal through the tuner 171, and determine the broadcast alternative mode based on the checked RSSI.

The processor 176 may be configured to, upon determining that the broadcast device does not exist in the shadow area, automatically perform a mute mode as a broadcast alternative mode in the shadow area.

The processor 176 may be configured to, upon determining that the broadcast device exists in the shadow area, allow the first broadcast output mode or the second broadcast output mode to be automatically performed as a broadcast alternative mode in the shadow area.

The processor 176 may be configured to, in response to the RSSI in the shadow area being greater than or equal to the reference RSSI while the broadcast device exists in the shadow area, adjust the sound quality or picture quality while controlling frequency maintenance, or change the operation mode to the first broadcast output mode.

The processor 176 may be configured to, in response to the RSSI in the shadow area being less than the reference RSSI while the broadcast device exists in the shadow area, change the operation mode to the first broadcast output mode or to the second broadcast output mode.

The processor 176 may check the frequencies transmitted with a RSSI greater than or equal to a preset RSSI in the shadow area, and automatically perform the first broadcast output mode or the second broadcast output mode based on a broadcast programs corresponding to the checked frequencies.

The processor 176 may check the frequencies transmitted with a RSSI greater than or equal to a preset RSSI in the shadow area, and upon determining that execution of the first broadcast output mode is not performable based on a broadcast program provided before entering the shadow area and the broadcast programs corresponding to the checked frequencies, automatically perform the second broadcast output mode.

The processor 176 may determine whether the vehicle has exited from the shadow area by determining whether the current location is an exit position of the shadow area based on the current location information and the preset location information of the shadow area.

The processor 176 may determine whether the vehicle has exited from the shadow area based on the length information of the shadow area and the travelling speed information.

The processor 176 may determine whether the current location is the entry position of the shadow area based on the current location information and the map information, and may determine whether the current location is the exit position of the shadow area based on the current location information and the map information.

The processor 176 may be configured to, upon determining that the vehicle has existed from the shadow area, control output of the broadcast signal for the broadcast program performed before the entry of the shadow area.

The processor 176 may be configured to, upon determining that the vehicle has existed from the shadow area, control output of the broadcast signal for the broadcast program performed during traveling in the shadow area.

The processor 176 may be configured to, upon the RSSI of the broadcast signal in the shadow area being greater than or equal to the preset RSSI, determine that a broadcast device exists in the shadow area, and upon the RSSI of the broadcast signal in the shadow area being less than the preset RSSI, determine that a broadcast device does not exist in the shadow area.

The processor 176 may be configured to, in the determining of the existence of the broadcast device in the shadow area, compare the RSSIs at the position before entering the shadow area, the internal position of the shadow area, and the position after exiting from the shadow area with each other, and based on a result of comparing the RSSIs for each position, determine whether a broadcast device exits.

In more detail, the processor 176 may determine that the broadcast device exists when a result of comparing the RSSIs for each position is within a preset error range.

The processor 176 may be configured to, upon determining that the RSSI inside the shadow area is greater than or equal to the RSSI at the position before entering the shadow area, determine that a broadcast device exists.

The processor 176 may be configured to, upon determining that the RSSI inside the shadow area is greater than or equal to the RSSI at the position after exiting from the shadow area, determine that a broadcast device exists.

The processor 176 may determine that the broadcast device does not exist when a result of comparing the RSSIs for each position is out of the preset error range.

The processor 176 may be configured to, upon determining that the RSSI inside the shadow area is less than the RSSI at the position before entering the shadow area, determine that a broadcast device does not exist.

The processor 176 may be configured to, upon determining that the RSSI inside the shadow area is less than the RSSI at the position after exiting from the shadow area, determine that a broadcast device does not exist.

The processor 176 may acquire information about broadcast devices for each shadow area that is automatically collected from other vehicles through a connected car service (CCS) service of the current vehicle, and determine whether there is a broadcast device for each shadow area using a big data machine learning technique. With such a configuration, the broadcast service may be improved, and furthermore, the user convenience may be increased.

Referring to FIG. 5, the processor 176 may acquire a plurality of pieces of (M pieces) of big data through the CCS service.

The processor 176 may determine whether there is a broadcast device for each area through supervised learning. The determination will be described with reference to FIGS. 6A, 6B and 6C.

The processor 176 predicts the presence or absence of a broadcast device in a shadow area (e.g., a tunnel) using various techniques of machine learning.

Figure 6A:
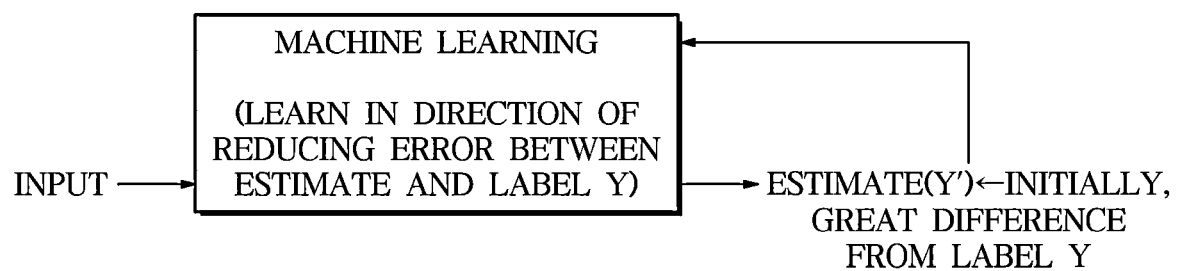
FIGS. 6A, 6B, and 6C are diagrams respectively illustrating an example of learning of a broadcast signal output device of a vehicle according to an embodiment.

Referring to FIG. 6A, the processor 176 may be configured to, upon identifying whether a broadcast device exists in at least one shadow area, apply a machine learning technique through supervised learning. For example, the presence or absence of a broadcast device in at least one shadow area is set as a label y, big data regarding various inputs x is provided, and machine learning is performed.

Such a technique corresponds to supervised learning among various techniques of machine learning due to the presence of a label, and for this, various supervised learning algorithms, such as K-Nearest Neighbor (KNN), linear regression, logistic regression, decision tree, random forest, and artificial neural network may be applied.

The input information includes latitude, longitude, legal dong code, frequency, and RSSI, and the output information includes presence or absence of a broadcast device.

Figure 6B:
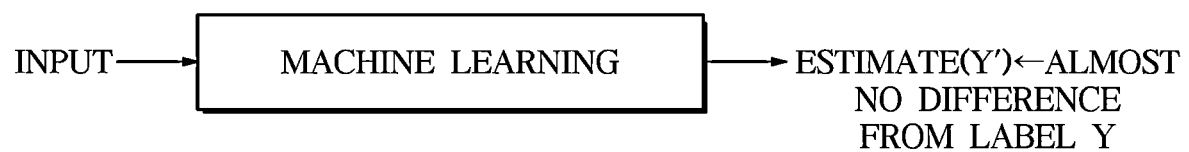

Referring to FIG. 6B, the machine that has completed learning provides an estimate (y': whether a broadcast device exists) with a high accuracy for various inputs.

Figure 6C:
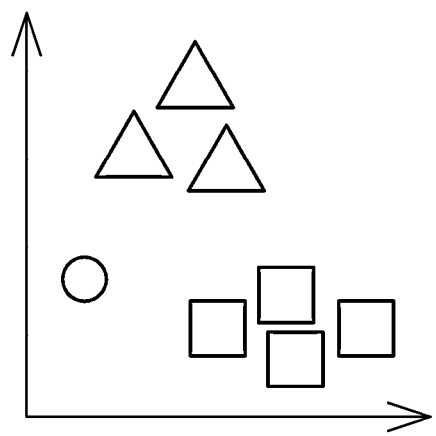

For example, referring to FIG. 6C, when x1 is a vehicle position and x2 is a RSSI, each class indicates whether a broadcast device is exists. In response to new data (o) being added, the trained machine selects a class with a high probability.

The processor 176 may determine whether a broadcast device for each area exists through unsupervised learning. The determination will be described with reference to FIG. 7.

The processor 176 may be configured to, without completely identifying whether a broadcast device exists, apply a clustering technique of unsupervised learning.

In this case, the processor 176 has only input data without a label y, and uses k-means clustering that is a representative example of a method of dividing clusters with only characteristics of input data x.

Figure 7:
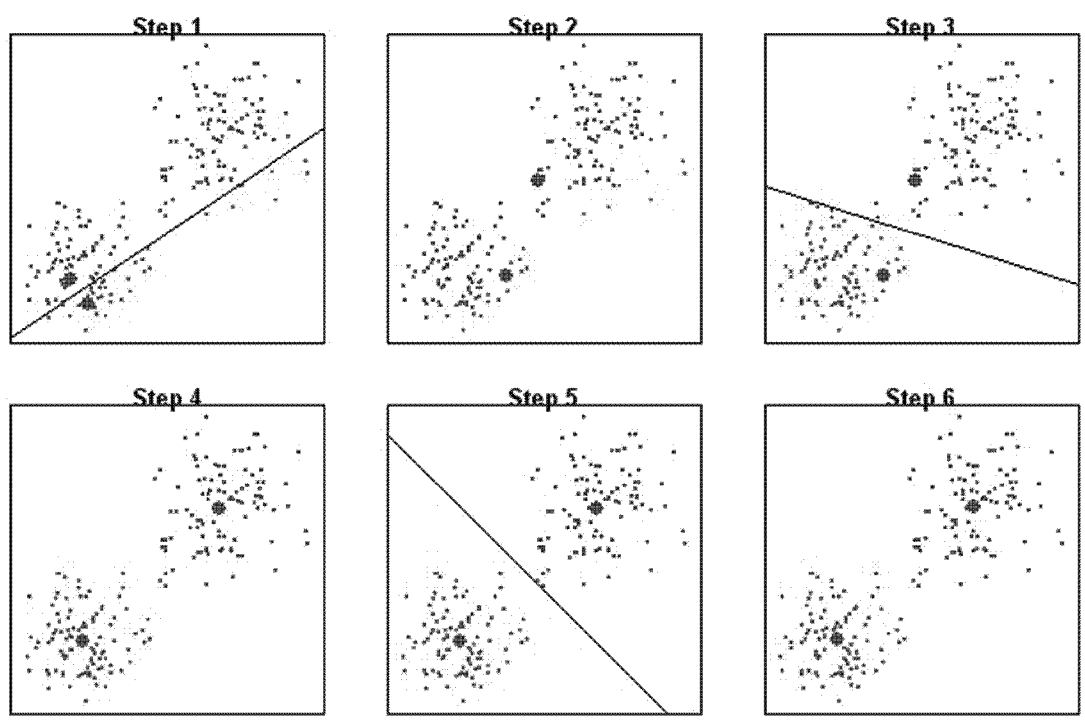
FIG. 7 is a diagram illustrating another example of learning of a broadcast signal output device of a vehicle according to an embodiment.

This is a case in which the processor 176 determines whether a broadcast device exists, the number of clusters is 2 (k=2). Referring to FIG. 7, the processor 176 may learn by itself and reach step 6 to determine whether a broadcast device exists.

The processor 176 may transmit the vehicle identification information and location information to the server 2 through the CCS service.

The processor 176 may be configured to, when transmitting the vehicle identification information and location information through the CCS service, check the RSSI at the position before entering the shadow area, the position inside the shadow area, and the position after exiting from the shadow area, and transmit information about the RSSI for each position to the server 2.

The processor 176 may receive broadcast device information for each shadow area from the server 2 and perform big data processing on the received broadcast device information for each shadow area to acquire broadcast device information for each shadow area.

The processor 176 may classify a shadow area in which a broadcast device does not exist and a shadow area in which a broadcast device exists, based on the broadcast device information for each shadow area acquired nationwide.

The processor 176 may be configured to, in response to the RSSI of the shadow area being greater than or equal to the reference RSSI, adjust the sound quality or receive and output the same broadcast program having a different frequency.

The adjusting of the sound quality may include removing a noise signal from the broadcast signal.

The processor 176 may be configured to, in response to the RSSI of the shadow area being less than the reference RSSI, receive and output the same broadcast program of a different frequency, or receive and output another broadcast program of a different frequency.

The processor 176 may update the broadcast device information for each shadow area stored in the memory 177.

The processor 176 may be configured to, upon determining that there is no broadcast device in the tunnel among the shadow areas, display a guide pop-up text "This tunnel is an area where radio broadcast signals are not receivable. Switch to mute." and then perform mute so that unpleasant noise is not output.

The processor 176 may be configured to, in response to the RSSI being less than the reference RSSI, retrieve another frequency for outputting the same broadcast program, and output the same broadcast program as the broadcast program provided before entering the tunnel using the retrieved frequency. The processor 176 may control the display to display a guide pop-up indicating that another frequency for outputting the same broadcast program is being retrieved.

The processor 176 may be configured to, in response to the RSSI being less than the reference RSSI, check frequencies of broadcast programs outputtable in the tunnel, and output a broadcast program different from the broadcast program provided before entering the tunnel using the checked frequency. The processor 176 may control the display to display a guide pop-up indicating that a broadcast program allowable for broadcasting in the tunnel is being retrieved.

The processor 176 may control the display to display a list of broadcast programs and channels of the retrieved frequencies, and may control output of a broadcast program selected by the user.

The processor 176 may be configured to, after exiting from the tunnel, control the display to display a guide pop-up indicating whether to keep the settings changed in the tunnel or whether to return to the settings before the entry into the tunnel.

The maintaining or changing of the broadcast program before and after entering the tunnel may also be selected from a basic setting option of the broadcast mode.

The memory 177 may store map information and may store location information of a shadow area.

The memory 177 may store reference RSSI information for each location of the shadow area.

The memory 177 may store frequency information having a RSSI greater than or equal to the reference RSSI for each location of the shadow area, and may store a table in which broadcast programs are matched according to frequencies.

The memory 177 may store a reference RSSI for determining the broadcast alternative mode.

The memory 177 may store a set RSSI for determining whether a broadcast device exists.

The memory 177 may store a preset RSSI for determining another frequency for outputting the same broadcast program corresponding to the first broadcast output mode.

The broadcast signal output device may further include a communicator for communication between the processor and the controller. The communicator of the broadcast signal output device may receive current location information from a location receiver.

The broadcast signal output device may include the location receiver.

When the broadcast signal output device is implemented as a terminal, the broadcast signal output device may include an inputter, a display, and a sound outputter.

At least one component may be added or omitted to correspond to the performance of the components of the vehicle shown in FIGS. 2 and 4 In addition, the mutual positions of the components may be changed to correspond to the performance or structure of the system.

The components shown in FIGS. 2 and 4 may refer to a software component and/or a hardware component, such as a Field Programmable Gate Array (FPGA) and an Application Specific Integrated Circuit (ASIC).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, according to the present disclosure, the receive signal strength indicator (RSSI) of a broadcast signal is determined so that a driver can be provided with an improved broadcast (e.g., radio) service to be suitable for a given situation, and the maintenance of the service can be automatically performed.

According to the present disclosure, by adding a logic that automatically collects various types of user information of the current vehicle through a connected car service (CCS) service of the vehicle and determines the presence or absence of a broadcast device based on the collected pieces of user information and a big data machine learning technique, an improved broadcasting service can be provided and the convenience of user can be increased.

According to the present disclosure, when listening to the radio through an audio device, location information of the vehicle is received from a GPS receiver, an entry into a tunnel is determined based on the location information, and upon determining that the vehicle enters a tunnel, the frequency of a program currently being listened to is automatically retrieved and changed, so that the user can listen the same broadcasting station program continuously without a user's manipulation.

In addition, according to the present disclosure, since the driver may continuously listen to the same broadcasting station program, not only the convenience of driving can be provided, but also a safety accident can be prevented by allowing the driver to concentrate on the driving.

In addition, according to the present disclosure, the driver can listen to the radio with the optimal reception sensitivity for each region.

According to the present disclosure, a frequency having a receive signal strength indicator (RSSI) greater than or equal to a reference RSSI is checked, and a broadcast signal having the checked frequency is received and output, so that the convenience of driving can be provided, and a safety accident can be prevented by allowing the driver to concentrate on driving.

As described above, the present disclosure can improve the quality and marketability of the broadcast signal output device and the vehicle having the same, increase the user satisfaction, enhance the vehicle safety, and secure the product competitiveness.

Although embodiments of the present disclosure have been described for illustrative purposes, those having ordinary skill in the art should appreciate that various modifications, additions and substitutions are possible, without departing from the scope and spirit of the disclosure. Therefore, embodiments of the present disclosure have not been described for limiting purposes.

What is claimed is:

1. A broadcast signal output device comprising:
a communicator configured to receive current location information;
a memory in which map information is stored;
a tuner configured to receive a broadcast signal having a frequency;
a processor configured to:
determine whether a current location is a shadow area based on the current location information and the map information,
determine whether a broadcast device is present upon determining that the current location is the shadow area,
mute the received broadcast signal to inhibit noise from being output upon determining that the broadcast device is absent, and
control output of the received broadcast signal upon determining that the broadcast device is present; and a sound outputter configured to output an audio signal in the received broadcast signal in response to a control command of the processor,
wherein:
the communicator is configured to perform communication with a server, and
upon determining that the current location is the shadow area, the processor is configured to:
transmit the current location information to the server,
receive information about an existence of a shadow area specific broadcast device from the server, and
determine whether the broadcast device is present in the shadow area of the current location based on the received information about the existence of the shadow area specific broadcast device.

2. The broadcast signal output device of claim 1, wherein the memory is configured to store location information of the shade area, and
the processor is configured to compare the current location information with the location information of the shadow area stored in the memory and determine whether the current location is the shadow area.

3. The broadcast signal output device of claim 1, wherein the processor is configured to learn the information about the existence of the shadow area specific broadcast device received from the server and determine whether the broadcast device is present in the shadow area of the current location.

4. The broadcast signal output device of claim 1, wherein the processor is configured to:
control the communicator to transmit receive signal strength indicator (RSSI) information at an entry point of the shadow area, RSSI information in the shadow area, and RSS information at an exit point of the shadow area to the server, and
determine whether the broadcast device is present in the shadow area based on the RSSI information at the entry point of the shadow area, the RSSI information in the shadow area, and the RSS information at the exit point of the shadow area.

5. The broadcast signal output device of claim 1, further comprising a display,
wherein upon determining that the current location is the shadow area, the processor is configured to control the display to display information about a broadcast signal having a frequency receivable through the tuner.

6. The broadcast signal output device of claim 1, further comprising a broadcast signal processor configured to acquire information about an RSSI of the received broadcast signal,
wherein:
upon determining that the current location is the shadow area and the broadcast device is present in the shadow area, the processor is configured to determine whether the acquired RSSI is greater than or equal to a reference RSSI, and
upon determining that the acquired RSSI is greater than or equal to the reference RSSI, the processor is configured to remove noise from the audio signal in the received broadcast signal to adjust a sound quality.

7. The broadcast signal output device of claim 6, wherein the processor is configured to, upon determining that the acquired RSSI is less than the reference RSSI, perform a first broadcast output mode to output a same broadcast program as a broadcast program before an entry into the shadow area.

8. The broadcast signal output device of claim 6, wherein the processor is configured to, upon determining that the acquired RSSI is less than the reference RSSI, perform a second broadcast output mode to output a broadcast signal having a frequency different from a broadcast signal having a frequency received before an entry into the shadow area.

9. The broadcast signal output device of claim 1, further comprising a broadcast signal processor configured to acquire information about an RSSI of the received broadcast signal,
wherein the processor is configured to, upon determining that the current location is the shadow area and the broadcast device is present in the shadow area, determine whether the acquired RSSI is greater than or equal to a reference RSSI, and upon determining that the acquired RSSI is greater than or equal to the reference RSSI, perform a first broadcast output mode to output a same broadcast program as a broadcast program before an entry into the shadow area.

10. The broadcast signal output device of claim 9, wherein the processor is configured to, upon determining that the acquired RSSI is less than the reference RSSI, perform a second broadcast output mode to output a broadcast signal having a frequency different from a broadcast signal having a frequency received before the entry into the shadow area.

11. The broadcast signal output device of claim 1, wherein the processor is configured to,
upon determining that the current location is the shadow area and the broadcast device is present in the shadow area, perform a first broadcast output mode to output a same broadcast program as a broadcast program before an entry into the shadow area.

12. The broadcast signal output device of claim 1, further comprising a broadcast signal processor configured to acquire information about an RSSI of the received broadcast signal,
wherein the processor is configured to, upon checking that the RSSI is greater than or equal to a preset RSSI, determine that the broadcast device is present, and upon checking that the RSSI is less than the preset RSSI, determine that the broadcast device is absent.

13. The broadcast signal output device of claim 1, further comprising an inputter,
wherein the processor is configured to, upon receiving a first broadcast output mode through the inputter, determine whether the current location is a shadow area in which a broadcast device is provided, and upon determining that the current location is the shadow area in which the broadcast device is provided, check a broadcast program being broadcast, check a frequency for outputting the checked broadcast program, and control the tuner to receive a broadcast signal having the checked frequency.

14. The broadcast signal output device of claim 1, further comprising an inputter,
wherein the processor is configured to, upon receiving a second broadcast output mode through the inputter, determine whether the current location is a shadow area in which a broadcast device is provided, and upon determining that the current location is the shadow area in which the broadcast device is provided, check a broadcast signal having a receivable frequency, and control output of the checked broadcast signal.

15. The broadcast signal output device of claim 1, further comprising a display,
wherein the processor is configured to control the display to output a video signal in the broadcast signal.

16. A vehicle comprising:
an inputter;
a location receiver configured to receive current location information; and
a broadcast signal output device configured to receive a broadcast signal having a frequency and output an audio signal in the received broadcast signal,
wherein the broadcast signal output device is configured to:
determine whether a current location is a shadow area based on the current location information and pre-stored map information,
transmit the current location information to a server upon determining that the current location is the shadow area,
receive information about an existence of a shadow area specific broadcast device from the server,
determine whether the broadcast device is present in the shadow area of the current location based on the received information about the existence of the shadow area specific broadcast device, and
mute the received broadcast signal to inhibit noise from being output upon determining that the broadcast device is absent.

17. The vehicle of claim 16, wherein the broadcast signal output device is configured to, upon checking that a receive signal strength indicator (RSSI) of the received broadcast signal is greater than or equal to a preset RSSI, determine that the broadcast device is present, and upon checking that the RSSI is less than the preset RSSI, determine that the broadcast device is absent.

18. The vehicle of claim 16, wherein the broadcast signal output device is configured to:
upon determining that a broadcast alternative mode input by the inputter is a first broadcast output mode, check a broadcast program being broadcast, check a frequency for outputting the checked broadcast program, and control a tuner to receive a broadcast signal having the checked frequency, and
upon determining that the broadcast alternative mode is a second broadcast output mode, check a broadcast signal having a frequency receivable through the tuner, and control output of the checked broadcast signal.

19. The vehicle of claim 16, further comprising a display,
wherein the broadcast signal output device is configured to control the display to output a video signal in the broadcast signal.

* * * * *